United States Patent [19]
Gerszberg et al.

[11] Patent Number: 5,983,098
[45] Date of Patent: Nov. 9, 1999

[54] DUAL-MODE NETWORK ACCESS POINT

[75] Inventors: Irwin Gerszberg, South Brunswick; Martin J. McGowan, Cranford; Jesse Eugene Russell, Piscataway, all of N.J.

[73] Assignee: Lucent Technologies Inc., Murray Hill, N.J.

[21] Appl. No.: 08/657,918

[22] Filed: May 31, 1996

[51] Int. Cl.⁶ .................................................... H04Q 7/20
[52] U.S. Cl. .................... 455/426; 455/422; 455/428; 455/550; 455/552
[58] Field of Search ...................... 455/426, 462, 455/463, 464, 550, 552, 554, 555, 560; 379/130, 113, 114, 131, 140

[56] References Cited

U.S. PATENT DOCUMENTS

| | | | |
|---|---|---|---|
| 4,751,728 | 6/1988 | Treat | 379/113 |
| 4,922,517 | 5/1990 | West, Jr. et al. | 455/426 |
| 5,127,042 | 6/1992 | Gillig et al. | |
| 5,341,415 | 8/1994 | Baran. | |
| 5,345,498 | 9/1994 | Mauger | 455/426 X |
| 5,371,782 | 12/1994 | Casey, III et al. | |
| 5,371,898 | 12/1994 | Grube et al. | 455/426 |
| 5,390,233 | 2/1995 | Jensen et al. | |
| 5,425,085 | 6/1995 | Weinberger et al. | 379/130 X |
| 5,504,803 | 4/1996 | Yamada et al. | 455/426 |
| 5,509,047 | 4/1996 | Uchikura | 455/426 X |
| 5,526,403 | 6/1996 | Tam | 455/426 |
| 5,548,631 | 8/1996 | Krebs et al. | 455/426 |
| 5,550,895 | 8/1996 | Burson et al. | 455/426 X |
| 5,600,709 | 2/1997 | Hoflinger | 455/462 X |

Primary Examiner—Wellington Chin
Assistant Examiner—Yemane Woldetatios

[57] ABSTRACT

A dual-mode network access point device for enabling a user to select between at least two telecommunication service providers using the user's existing telecommunications wiring. The device includes a wireless interface circuit adapted for coupling one or more antennas which are used for transmitting signals to and receiving signals from a wireless service provider and a switching circuit for selectively coupling a first telecommunication device between a wireline service provider and the wireless interface circuit is provided in the device. The device further includes a controller circuit which enables the switching circuit automatically in response to an incoming call and on command to select either the wireline service provider or the wireless interface circuit.

22 Claims, 1 Drawing Sheet

of the local exchange carrier.

DUAL-MODE NETWORK ACCESS POINT

FIELD OF THE INVENTION

The present invention relates to an apparatus for supporting various telecommunication service providers and more specifically to an apparatus for enabling a user to gain access to alternate telecommunication service providers.

BACKGROUND OF THE INVENTION

The prior art describes many different methods for gaining access to alternative telecommunication service providers. For example, present cellular telephones allow a subscriber to switch between two different carriers, i.e., an A carrier or a B carrier, on a per-call preference. One such telephone is described in U.S. Pat. No. 5,127,042 entitled CELLULAR CORDLESS TELEPHONE issued to Gillig et al. on Jun. 30, 1992. There, a cellular telephone is described which is capable of placing a telephone call using the subscriber's cellular carrier or a telephone call via the base of a cordless telephone which uses the subscriber's telephone landline carrier. Whenever the cellular telephone is within range of the base of the subscriber's cordless telephone base, the cellular telephone automatically operates as a cordless telephone and selects the subscriber's telephone landline carrier.

Similarly, there are telecommunication systems where wireless telephones and conventional wired telephones are integrated to permit an in-progress telephone conversation to be transferred between wired and wireless telephones without further action by the telecommunication switch that facilitated the initial call. Such a system is described in U.S. Pat. No. 5,390,233 entitled TELEPHONE CALL TRANSFER BETWEEN A WIRELESS AND WIRED TELEPHONE issued to Jensen et al. on Feb. 14, 1995. As described therein, a telecommunications switch and a wired telephone are connected respectively to first and second wired communication channels. A third wired communication channel is coupled to a radio frequency base station that supports a plurality of concurrent wireless communication channels to wireless telephones. An interface circuit coupled to all three channels switches the connection of the first channel associated with a telecommunications switch between the second and third channels, and hence switches the established connection between the wired and wireless telephones.

The prior art also describes other systems for selecting between a plurality of telecommunication service providers. In U.S. Pat. No. 5,371,782 entitled METHOD AND APPARATUS FOR SELECTING A PREFERRED SERVICE PROVIDER DURING A CALL SETUP IN A CALL SETUP IN A PUBLIC CORDLESS TELEPHONE SYSTEM, issued to Casey, III et al. on Dec. 6, 1994, there is described a public telephone system wherein a cordless telephone handset unit can be used to select a preferred service provider from a plurality service providers. By generating a service request containing a specific carrier request code, the handset selectively identifies an available public base unit served by the desired local service provider and then establishes a communications link with this base unit.

In U.S. Pat. No. 5,341,415 entitled METHOD AND APPARATUS FOR SHARING OF COMMON IN-HOUSE WIRING TO PERMIT MULTIPLE TELEPHONE CARRIERS TO SERVE THE SAME CUSTOMER, issued to Baran on Aug. 23, 1994, there is described a system which enables two or more telecommunication carriers to automatically connect to existing in-house telephone wiring according to the choice of the calling party.

Current methods and techniques, however, do not allow the higher-level decision, that of selecting one of the potentially available service access methods, in the hands of the user. Instead, as described above, the prior art allows the selection of a service provider to made in the network, as on the landline carrier, or in the air-interface, on the wireless access.

Accordingly, a need exists for a method which allows a user to select from available service providers based on cost or quality of service, either through stored profiles or at the user's option.

SUMMARY OF THE INVENTION

In accordance with the present invention, there is provided a device for enabling a user to select between at least two telecommunication service providers using the user's existing telecommunications wiring. The device includes a wireless interface circuit adapted for coupling one or more antennas which are used for transmitting signals to and receiving signals from a wireless service provider and a switching circuit for selectively coupling a first telecommunication device between a wireline service provider and the wireless interface circuit is provided in the device. The device further includes a controller circuit which enables the switching circuit automatically in response to an incoming call and on command to select either the wireline service provider or the wireless interface circuit.

In an enhancement of the present invention, the device also include a cordless telecommunication device interface circuit adapted for coupling an antenna for transmitting signals to and receiving signals from a cordless telecommunication device.

In yet a further enhancement of the present invention, the device also includes a smart agent for automatically selecting either the wireline service provider or the wireless interface circuit in response to an outgoing call.

DESCRIPTION OF THE DRAWING

A more complete understanding of the present invention may be obtained from consideration of the following description in conjunction with the drawing in which.

DETAILED DESCRIPTION OF VARIOUS ILLUSTRATIVE EMBODIMENTS

Figure 1:
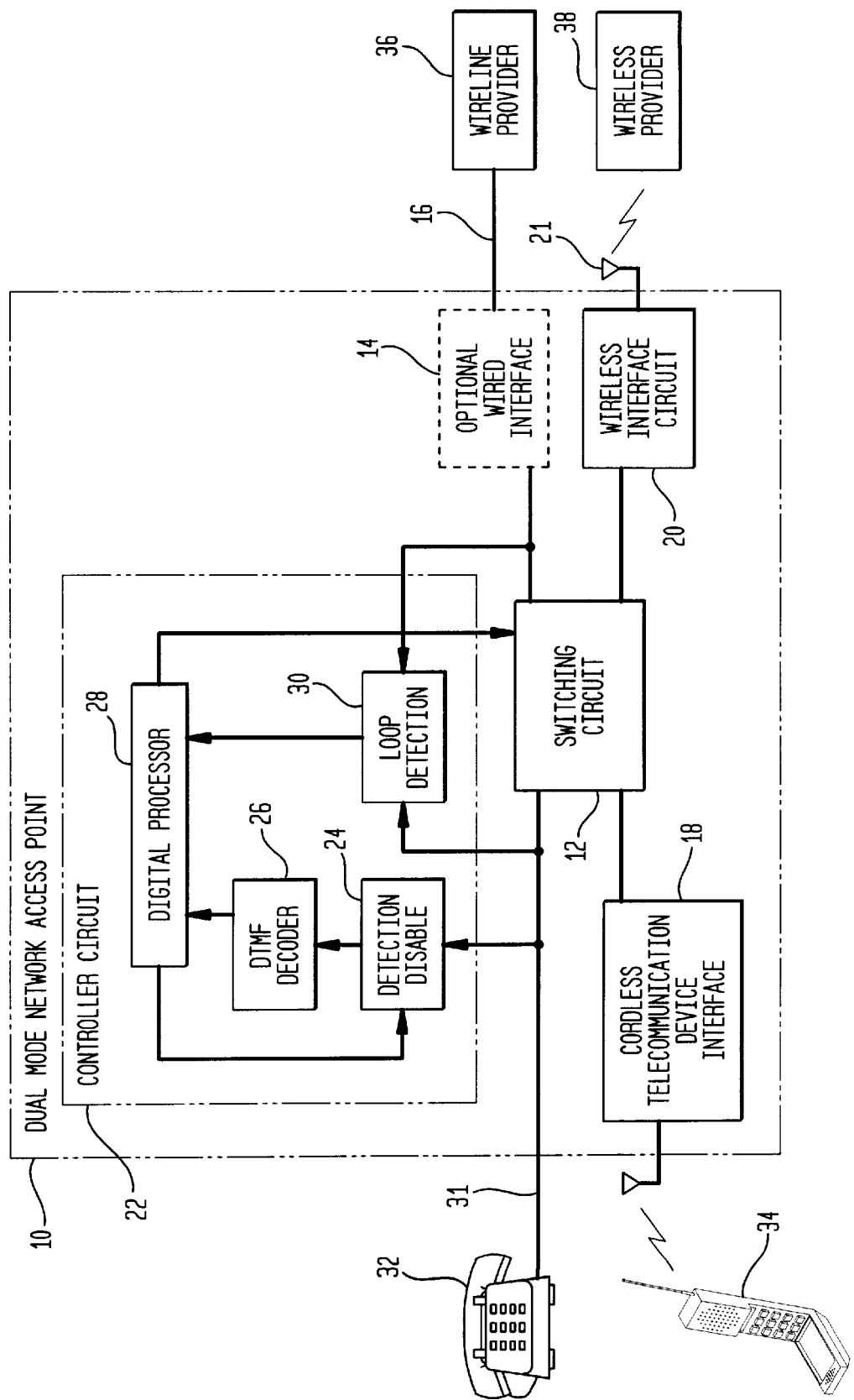
FIG. 1 is a schematic representation of the dual-mode network access point device of the present invention.

Although the present invention is particularly well suited for use in a telecommunication network having a wired service provider and a wireless service provider, and shall be described with respect to this application, the methods and apparatus disclosed here can be applied to other switched networks having at least two service providers such as cable or fiber optic networks.

The Dual-mode Network Access Point (DNAP) of the present invention assumes the availability of alternate telecommunication service access, either wired and wireless, multiple wired, cable and wired, etc., in any combination. In addition, the present invention assumes that cellular access will be available at sufficiently low cost and high quality to be a competitive alternative to the local exchange carrier.

Implementation of the present invention will free a user from conventional single connection-local exchange carrier access. Accordingly, the present invention will spawn alternate access circuit service providers who will be more conscious of individual user preferences and needs.

The DNAP of the present invention enables a user of a traditional wireline service provider to obtain wireless access without further modification to the user's home circuitry. More specifically, the present invention can be embodied as a dual mode outside, inside or tip and ring base unit, or a single or multi-mode-cellular telephone, a multi-mode tip and ring or a multi-mode cable base unit, capable of multiple service access demarcations while employing existing telephone and telecommunication apparatus connected to existing telephone wiring.

Referring to FIG. 1, an illustrative embodiment of the dual-mode network access point (DNAP) of the present invention is shown and denoted by numeral 10. The DNAP 10 is connected in series between the existing wireline service provider 36 and the existing premises wiring 31. The embodiment shown will give a user a dual-mode time division multiple access (TDMA) fixed cordless base unit which operates essentially like a dual-mode analog/TDMA cellular telephone, but tethered to the existing home telephone circuit.

The DNAP 10 includes a switching circuit 12 for selectively coupling one or more telecommunication device(s) between the existing wireline service provider 36 and a wireless interface circuit 20 contained within the DNAP 10. Such switching circuitry is well known in the art (see for example, U.S. Pat. No. 5,341,415 described earlier) and therefore, is not described herein any greater detail. As shown, one of the telecommunications devices, a wired telephone 32, is connected to the telecommunication device side of the switching circuit 12. An optional wired interface circuit 14 is connected to the service provider side of the switching circuit 12 and operates to connect a user to the wireline service provider 36. It is preferred that the wired interface circuit 14 be configured as an Integrated Services Digital Network (ISDN) interface so that in applications where the wireline service provider 36 is ISDN, multiple terminals may be connected. An optical fiber or coaxial cable can be utilized for the wire line 16 to couple the wired interface circuit 14 to the wireline service provider 36.

A cordless telecommunication device interface circuit 18 is provided for coupling a 46–49 MHz antenna 18 for transmitting signals to and receiving signals from a cordless phone 34. The cordless telecommunication device interface circuit 18 is connected to the telecommunication device side of the switching circuit 12. The cordless telephone 34 can be either a 46–49 MHz band or 900 MHz band cordless telephone which can be operated from a wall junction.

The earlier mentioned wireless interface circuit 20 is provided in the DNAP 10 for connecting one or more wireless antenna(s) 21 which can include a wireless 900/1800 MHz antenna, a wireless 1.5/1.8 GHz antenna 24 for Personal Communication Service (PCS), or a combination of both, to the DNAP 10. The antenna(s) 21 operate to transmit signals to and receive signals from the wireless service provider 38. It is preferred that the wireless interface circuit 20 be configured as an ISDN interface so that ISDN wireless service providers can be connected.

The switching circuit 12 is controlled by a controller circuit 22 contained within the DNAP 10. The controller circuit 22 is connected to the premises wiring 31 on both sides of the switching circuit 12. The controller circuit is also connected to the switching circuit 12. The controller circuit 22 includes a Detection Disable module 24, a Dual-Tone, Multi-frequency detector (DTMF) 26, a digital processor 28 and a Loop Detection module 30. The controller circuit 22 automatically in response to an incoming call as well as on command, enables the switching circuit 12 to select between the wireline service provider 36 and the wireless interface circuit 20. The digital processor 28 includes a stored program otherwise known as a "smart agent" for automatically selecting between the wireline service provider 36 and the wireless interface circuit 20 when the user makes an outgoing call. The smart agent is capable of three modes of operation in selecting the network access. These modes consist of a manual selection mode, an automatic selection mode, and a default mode. In the manual selection mode, a user selects between the wireline service provider 36 and the wireless interface circuit 20. In the automatic selection mode, the smart agent selects between the wireline service provider 36 and the wireless interface circuit 20 as a function of time and day where the lower-cost telecommunication service provider is selected using a heuristic process stored in the digital processor 28, with data from the network as to which is the lower cost access method. In the default mode, the wireless interface circuit 20 is connected.

The digital processor 28 can also include a program for a "routing agent". When a user places a long distance phone call, the routing agent selects a long distance carrier as a function of the cost of routing the call.

The DNAP 10 can also include circuitry and hardware for accepting a POTS line which plugs into the base unit 10 with RJ-11. The wireline provider is also accessed through an RJ-11 out.

Accordingly, a user can use either handset terminals 32 or 34 conventionally to place and receive calls. As can be seen in FIG. 1, the premises wiring is connected to the DTMF 26 of the controller circuit 22 to receive user commands and thus, the earlier mentioned default mode setting connects the user's premises wiring 31 to the wireless interface 20. A message such as "*55" is then reserved to allow the user to switch to the wireline service provider 36 if desired. The digital processor 28 can signal the detection disable module 24 to disable the DTMF 26 depending on the service provider's features for the user. When the user selects the wireline service provider 36, conventional service and features of the wireline service provider 36 are available. After completing a call and when the user goes on-hook, the switching circuit 12 defaults to the wireless interface 20.

Incoming calls on the wireless interface 20 are received in a conventional manner. The wired and/or cordless terminal rings in response to an incoming wireless call. When the call is complete, and the user goes on-hook, the DNAP 10 remains in the default mode.

An incoming call received from the wireline service provider 36, causes the loop detection module to instruct the digital processor 28 to cause the switching circuit 12 to switch to handle the incoming wireline service call. Upon the termination of the call, the switching circuit 12 switches to the wireless interface 20.

When a call is being served on one of the service providers, and a call appears on the other service provider, the switching circuit 12 returns a busy signal to the other provider.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A device for enabling selecting between a wireline service provider and a wireless service provider using existing telecommunications wiring, said device comprising:
   a wireless interface circuit adapted for coupling first antenna means for transmitting signals to and receiving signals from the wireless service provider;
   a switching circuit selectively coupling existing telecommunications wiring between said wireline service provider and said wireless interface circuit; and
   a controller circuit which enables said switching circuit automatically in response to an incoming call and on command to select one of said wireline service provider and said wireless interface circuit;
   wherein said existing telecommunications wiring is coupled to at least one telecommunication device and any one of said at least one telecommunication device can through said existing telecommunications wiring remotely select and share access between a communication circuit of said wireless service provider and a communication circuit of said wireline service provider.

2. The device as recited in claim 1, further comprising a cordless telecommunication device interface circuit adapted for coupling a second antenna means for transmitting signals to and receiving signals from a cordless telecommunication device.

3. The device as recited in claim 1, said controller circuit further comprising a smart agent for automatically selecting one of said wireline service provider and said wireless interface circuit in response to an outgoing call.

4. The device as recited in claim 1, further comprising a routing agent for routing a call to a long distance carrier, wherein selection of said long distance carrier is a function of cost of routing said call.

5. The device as recited in claim 3, wherein said smart agent operates in a plurality of different modes.

6. The device as recited in claim 5, wherein one of said plurality of different modes of operation includes a manual selection mode wherein a user selects between said wireline service provider and said wireless interface circuit.

7. The device as recited in claim 5, wherein one of said plurality of different modes of operation includes an automatic selection mode wherein said smart agent selects between said wireline service provider and said wireless interface circuit as a function of time and day whereby a lower cost telecommunication service provider is selected.

8. The device as recited in claim 5, wherein one of said plurality of modes of operation includes a default mode which selects said wireless interface circuit.

9. The device as recited in claim 1 further comprising a wireline interface circuit coupled between said switching circuit and said wireline service provider.

10. The device as recited in claim 9 wherein said wireline interface circuit provides an ISDN interface.

11. The device as recited in claim 1, wherein said wireless interface circuit provides an ISDN interface.

12. A dual-mode network access point device for enabling selecting between a first telecommunication service provider and a second telecommunication service provider using existing telecommunications wiring, said device comprising:
   a first interface circuit adapted for coupling to the first telecommunication service provider;
   a second interface circuit adapted for coupling to the second telecommunication service provider;
   a switching circuit selectively coupling existing telecommunications wiring between said first interface circuit and said second interface circuit; and
   a controller circuit which enables said switching circuit automatically in response to an incoming call and on command to select one of said first interface circuit and said second interface circuit;
   wherein said existing telecommunications wiring is coupled to at least one telecommunication device, said device enabling remote selection and sharing between a communication circuit of the first telecommunication service provider and a communication circuit of the second telecommunication service provider.

13. The device as recited in claim 12, said controller circuit further comprising a smart agent for automatically selecting one of said first interface circuit and said second interface circuit in response to an outgoing call.

14. The device as recited in claim 12, further comprising a routing agent for routing a call to a long distance carrier, wherein selection of said long distance carrier is a function of cost of routing said call.

15. The device as recited in claim 13, wherein said smart agent operates in a plurality of different modes.

16. The device as recited in claim 15, wherein one of said plurality of different modes of operation includes a manual selection mode wherein a user selects between said first interface circuit and said second interface circuit.

17. The device as recited in claim 15, wherein one of said plurality of different modes of operation includes an automatic selection mode wherein said smart agent selects between said first interface circuit and said second interface circuit as a function of time and day whereby a lower cost telecommunication service provider is selected.

18. The device as recited in claim 15, wherein one of plurality of modes of operation includes a default mode which selects one of said first interface circuit and said second interface circuit.

19. The device as recited in claim 12 wherein said first interface circuit provides an ISDN interface.

20. The device as recited in claim 12, wherein said second interface circuit provides an ISDN interface.

21. A telecommunications demarcation multiple access device for enabling selecting between at least two telecommunication service providers using existing telecommunications wiring, said device comprising:
   a first interface circuit adapted for coupling to a first telecommunication service provider;
   a second interface circuit adapted for coupling to a second telecommunication service provider;
   a switching circuit which automatically in response to an incoming call and on command switches coupling of said existing telecommunications wiring between said first interface circuit and said second interface circuit; and
   a smart agent for automatically selecting between said first interface circuit and said second interface circuit in response to an outgoing call;
   wherein said existing telecommunications wiring is coupled to at least one selected telecommunication device, said device enabling remote selection and sharing of a communication circuit of the first telecommunication service provider and a communication circuit of the second telecommunication service provider by any one of said at least one selected telecommunication device.

22. The device as recited in claim 21, wherein said first interface circuit provides an ISDN interface.

* * * * *